Jan. 24, 1956  J. FUTTERMAN  2,732,526
APPARATUS FOR TESTING CATHODE RAY TUBES
Filed June 21, 1952  3 Sheets-Sheet 1

INVENTOR.
JULIUS FUTTERMAN
BY
James and Franklin
ATTORNEYS

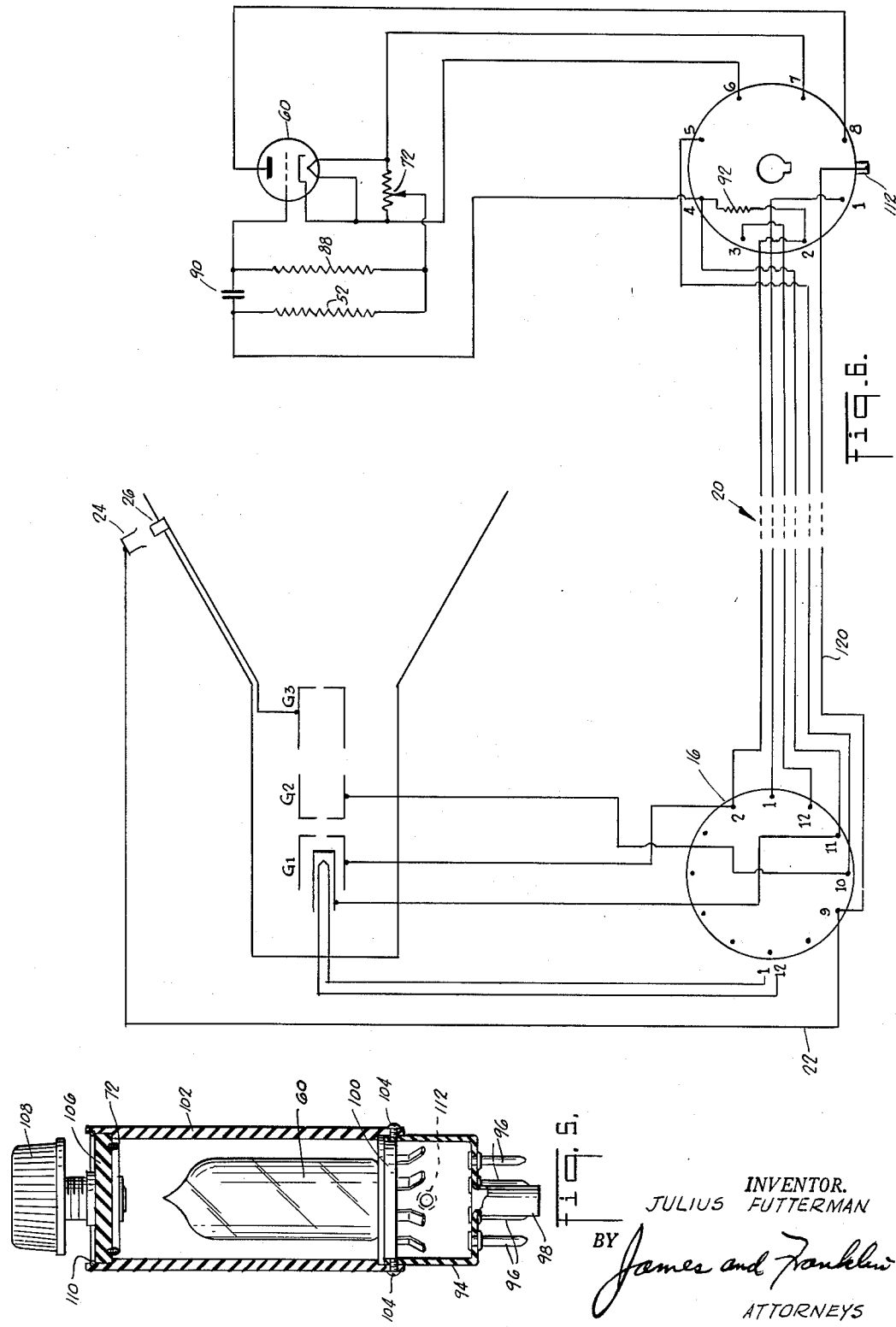

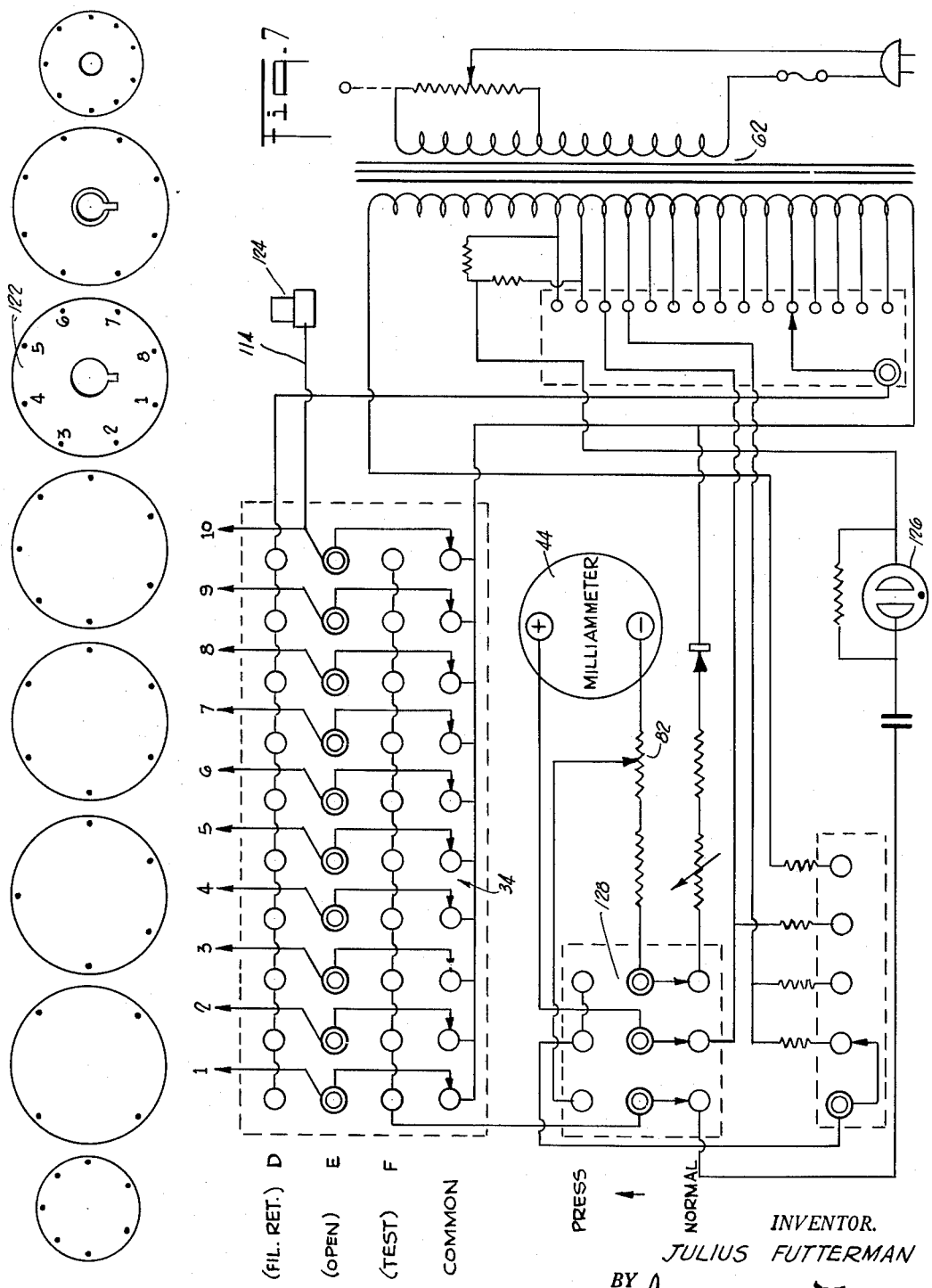

United States Patent Office 2,732,526
Patented Jan. 24, 1956

2,732,526
APPARATUS FOR TESTING CATHODE RAY TUBES

Julius Futterman, New York, N. Y., assignor to Precision Apparatus Co., Inc., Elmhurst, N. Y., a corporation of New York Application June 21, 1952, Serial No. 294,819

20 Claims. (Cl. 324—24)

This invention relates to apparatus for testing a cathode ray tube, and more particularly for testing the adequacy of its beam current.

The primary object of the invention is to generally improve tube testers. A more particular object is to provide an adapter which is readily used with standard types of tube testers to adapt the same to the testing of CR (cathode ray) tubes, and more especially television picture tubes.

Ordinary vacuum tube testers are not capable of testing CR tubes, and special tube testers have been made for CR tubes, but many servicemen are reluctant to invest in a second complete tester for the purpose. This has led to adapters which seek to test CR tubes on a regular vacuum tube tester. So far as I am aware these have performed an overall emission test, in which a circuit is established to measure the complete emission from the cathode to the nearest or control electrode. This test may give a very misleading result because the only useful component of the emission is that which goes into beam current, or which passes through the tiny aperture in the control electrode and reaches at least the next electrode or G2. A beam current test is more significant because the central part of the cathode area directly opposite the control electrode aperture may become exhausted, while the surrounding area still may be capable of good emission, so that exhaustion of the central area of the cathode would not be revealed by an overall emission test carried out between the cathode and the control electrode.

Accordingly, a further object of the present invention is to provide an adapter which will adapt an ordinary vacuum tube tester for the testing of CR tubes by measurement of the beam current. This requires a measurement of microamperes rather than milliamperes, and an ancillary object of the invention is to amplify the beam current sufficiently for use in the indicator of a conventional vacuum tube tester, although that indicator is usually a milliammeter.

The meter of a conventional tube tester employs a word scale, and in the usual tester about half the scale indicates defective tubes which should be replaced, while the other half of the scale represents good tubes which need not be replaced. Often there is a narrow zone marked "weak" or provided with a question mark, this zone being located between the "replace" (or equivalent word) half of the scale, and the "good" (or equivalent word) half of the scale. In common practice this "weak" zone is located at about the middle of the scale.

In the case of CR tubes, however, the range of inadequate beam current may be only a small fraction of the range of adequate beam current, which would introduce an extreme discrepancy in relation to the word scale. It is accordingly a further feature and object of the present invention to provide an adapter which so modifies the meter response as to make the word scale applicable to CR tubes.

Still another object of the invention centers about the structural form of the adapter for compactness and convenient use, the complete adapter comprising an ordinary CR tube socket, and a small plug-in unit, with a flexible cable extending therebetween, the plug-in unit having a vacuum tube base with prongs suited to plug into a selected one of the regular vacuum tube sockets forming a part of the vacuum tube tester.

To accomplish the foregoing general objects, and other more specific objects which will hereinafter appear, my invention resides in the apparatus elements, and their relation one to another, as are hereinafter more particularly described in the following specification. The specification is accompanied by drawings, in which:

Fig. 5 is a section through the plug-in unit and is explanatory of the mechanical arrangement thereof;

Fig. 6 is a wiring diagram for the adapter, and shows its relation to the electrodes of the CR tube being tested; and Fig. 7 is a wiring diagram of a typical vacuum tube tester with which the adapter of my invention may be employed.

Figure 1:
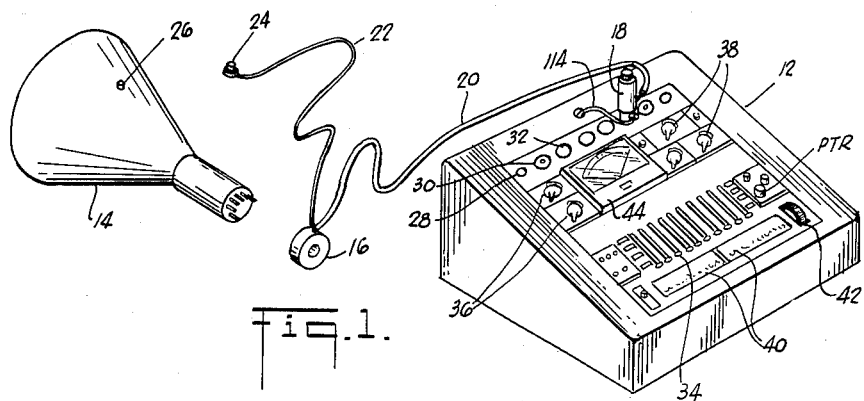
Fig. 1 is a perspective view showing a preferred form of my invention.

Referring to the drawing, and more particularly Fig. 1, a conventional commercially available vacuum tube tester is indicated at 12. It is here being used to test a typical CR tube 14 with the aid of an adapter, the said adapter comprising essentially a CR tube socket 16, a plug-in unit 18, and a multi-wire flexible cable 20 extending between the socket 16 and the unit 18. This cable is preferably made about three feet or more in length, for convenience. The adapter preferably includes an additional flexible single wire lead 22 terminating in a suitable clip 24 adapted to be applied to the high voltage cap 26 of the CR tube.

As is usual in such devices, the tube tester 12 has a row of different vacuum tube sockets 28, 30, 32, etc. intended to receive different types of vacuum tube. There is also a row of switches 34 which in this case are of the lever type, movable forward and back in slots. These permit proper circuit connections to be set up for the testing of any particular type of vacuum tube. There are also adjustable resistors and switches with appropriate control handles and scales, indicated at 36 and 38, which permit appropriate circuit constants to be established for the testing of different tube types. The tester is supplied with a chart showing how the different controls are to be set up for each tube, and in the present case the chart is a roller chart, a small part of which is exposed through an appropriate window 40, the chart being rolled or moved from one part to another by a suitable knob 42. The tester is further provided with a suitable indicator or meter 44, and this is commonly provided with a so-called "word scale" to show the condition of the tube being tested.

Figure 4:
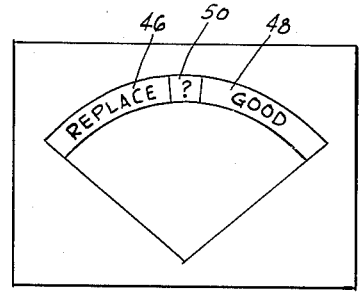
Fig. 4 represents the face of the indicator or meter of a typical vacuum tube tester.

Referring to Fig. 4, the typical word scale has about half the range marked with the word "Replace" or equivalent word, as indicated at 46, while approximately half the scale is marked with the word "Good" or equivalent word, as indicated at 48. These are frequently colored, using red for the "Replace" part of the scale and green for the "Good" part of the scale. In many cases a narrow zone, indicated at 50, is colored with a third color, typically yellow, and marked with the word "Weak" or the like or with a question mark. In the indicator shown in Fig. 4 this doubtful zone is located at the middle of the scale, and that is a common arrangement, but it is not essential, for the dividing zone may be offset from the middle of the scale, but even in such cases a very large part of the scale represents tubes which are to be replaced or rejected.

This is in conflict with the situation which arises when testing CR tubes for beam current values. In a typical case the manufacturer may employ beam current test limits of from 400 to over 1,700 microamperes with a D. C. potential of 250 volts on G2, which, it will be observed, is a ratio of more than four to one. This is for new tubes, and in used tubes the beam current may drop to far less, say 100, before considering the tube unsatisfactory. The microampere readings given above are independent of the picture size of the tube.

In the present adapter the potential applied to G2 is less, it being about 229 volts R. M. S. if full cycle, but here only half cycles are used. Also there is a high resistor 52 in series. In terms of percentage of the scale, however, generally similar ratios apply, so that the dividing point between good and bad tubes may be at say 8% of the scale.

Figure 2:
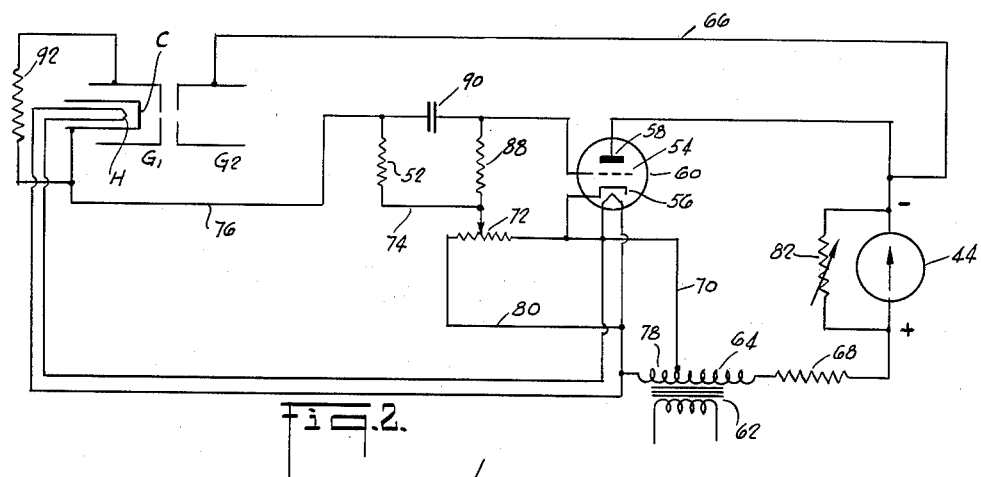
Fig. 2 is a schematic wiring diagram explanatory of the beam current measuring circuit of the invention.

Referring now to Fig. 2, the cathode emission surface is indicated at C; its heater at H; and the control electrode at G1, while the next electrode is indicated at G2. Total emission may be measured by establishing a circuit between the cathode C and the control electrode G1, but this is not a satisfactory test because the useful emission is that which passes through the minute aperture at the center of the control electrode G1 to the electrode G2. It has been found that a cathode may have adequate total emission without, however, having adequate useful emission or beam current, which may be due to exhaustion of the center area alone of the cathode. A beam current test measures the electron flow in a circuit established between the cathode and the accelerating grid G2. In the present case this current is flowed through a load resistor 52, the said load resistor being connected between the grid 54 and the cathode 56 of an amplifier tube 60. The meter 44 is connected to the anode 58 of tube 60, and the amplification provided by the tube 60 solves one of the problems arising from the fact that while total emission is measurable in milliamperes, and the indicator 44 is a milliammeter, the beam current must be measured in microamperes.

Considering the circuit in greater detail, a power supply transformer is indicated at 62, and its secondary 64 supplies potential to polarize the grid G2. The use of A. C. is permissible because of the self-rectifying action of the tube elements, the positive half cycles only being effective. Thus the beam current circuit may be traced from grid G2 through conductor 66 through meter 44, load resistor 68, transformer secondary 64, conductor 70, potentiometer 72, conductor 74, load resistor 52, and conductor 76 leading to the cathode.

For biasing purposes a negative part 78 of the transformer secondary is connected to the grid through conductor 80 and potentiometer 72. In the present case this same section 78 is employed to energize the cathode heaters of tube 60 and the CR tube under test. The potentiometer 72 permits variation of the bias voltage anywhere from maximum down to zero. This permits a preliminary setting of the meter 44 for zero. For this purpose the potentiometer 72 is first moved all the way to the cathode (zero bias), and a sensitivity resistor 82 shunted across the meter 44 is set to bring the meter to an arbitrary figure, which is here recommended at about 80% of the scale, for a reason explained later, although it could be 90% or even 100%. The potentiometer 72 is then moved away from the cathode to provide enough negative bias potential from the negative transformer coil 78 to just bring the reading of the meter 44 down close to or at zero. The zero adjustment is important and desirable because it compensates for possible variations in the amplification, due to aging of the tube 60 or the associated circuit elements, or other changes.

It will be understood that during this zero adjustment the CR tube is not energized (except for cathode heater) and is effectively inoperative. After the meter is adjusted to zero as explained above the CR tube is energized, and the effect of its beam current in resistor 52 is to produce a positive voltage on the grid 54 of tube 60, which causes a plate current flow through the meter 44, and the meter reading is related to the beam current in a manner dependent on the tube characteristic.

Figure 3:
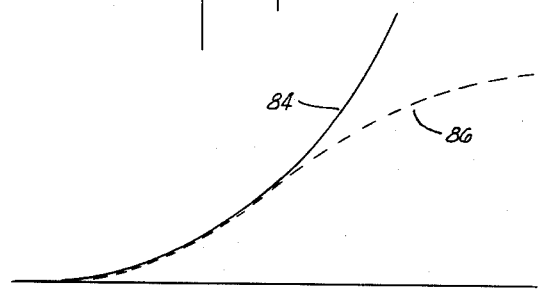
Fig. 3 is explanatory of an important feature of the invention.

Referring now to Fig. 3, the tube 60 would ordinarily have a rising characteristic, as indicated at 84, when plotting plate current against grid voltage. This is even worse than linear in respect to utilization of the meter scale shown in Fig. 4 with its dividing zone 50 located at the center of the scale, for it will be recalled that for CR tubes the dividing point between good and bad tubes may be located at say 15% of the scale, if using a linear scale.

In accordance with the present invention the circuit of Fig. 2 is modified to flatten or compress the characteristic curve to a position such as that indicated at 86. For this purpose I introduce an RC circuit consisting of resistor 88 and condenser 90 in Fig. 2. This provides a limiting action, and changes the tube characteristic so that by selecting proper values for the RC circuit the tube 60 will expand the response of the meter in the low range, so as to use nearly half the scale for bad tubes; and to use nearly the upper half of the scale for good tubes. Moreover, it is entirely feasible and desirable to use say 75% of the scale for a beam current about one third maximum, and the remaining or highest 25% of the scale for the rest of the range to the maximum. This helps show the true beam current response even at higher values; and helps protect the meter against injury when subjected to higher values. It is with this in mind that the initial setting of the sensitivity shunt 82 is set at a predetermined and recommended value when the bias is zero, for example to use 80% of the scale. This is a form of calibrating adjustment.

It will be understood that all these figures are given by way of rough example and are all subject to change depending on what is desired. By appropriately adjusting the values of condenser 90 and resistor 88 one can vary the compression of the characteristic curve and thus vary the relative change of sensitivity of the meter at different points on the scale.

The theory underlying the use of the RC circuit is that there will be grid current at high operating points but not at low operating points. For example, suppose the potentiometer 72 has been set to make use of five volts of the available bias. If the beam current produces a voltage across the load resistor 52 which voltage is less than 5 volts, there is no grid current flow, and no change in the tube characteristic. However, if the beam current is high enough to produce a voltage across resistor 52 higher than the bias of 5 volts, there will be grid current flow, resulting in an accumulation of negative electrons on the condenser 90, thereby making the grid more negative, and so increasing the negative bias, and thereby flattening the characteristic curve. The amount of bias is controlled by the size of the leak resistor 88 in relation to the size of the condenser 90, or, in other words, on the time constant of the RC circuit.

The use of the RC circuit may change the adjustment of the potentiometer 72 when setting it for zero reading, compared to its setting without the RC circuit. It will be recalled that the negative half cycles previously were disregarded. However, it will be seen that the negative cycles, while still ignorable for the plate side of the tube, are positive cycles on the grid side of the tube, and thus cause an electron flow from cathode to grid. This tends to build up electrons on the condenser of the RC circuit and to establish a negative potential on the grid. This results in a somewhat different adjustment of the potentiometer to produce the desired zero reading than would be the case with a more elementary circuit omitting the RC circuit. However, there is no practical difference from the view point of the operator, who simply follows instructions, and sets the potentiometer to achieve zero.

Before leaving the circuit of Fig. 2, it may be pointed out that the control electrode G1 is connected to the cathode through a resistor 92. The control electrode is not left free because it may accumulate electrons and build up a negative charge. It is therefore connected to the cathode, and insofar as the beam current test alone is concerned, it might be connected directly to the cathode without the resistor 92, but this is not done because the complete test includes a short circuit check between the different elements of the CR tube, and a direct connection would spoil this so-called "short check." The electrodes are therefore connected through a resistor 92 which is high enough in value to make possible the desired short check, and yet which serves to keep the control electrode at zero potential relative to the cathode.

A preferred structure for the plug-in unit is shown in Fig. 5, this being a simplified section taken through the axis of the unit. The unit comprises a vacuum tube base 94 of the octal type which is characterized by sturdy tubular prongs 96 (in contrast with the thin wire prongs of miniature tubes). Such a base is not only sturdy to withstand considerable manipulation plugging the same into and out of the tube tester whenever it is to be used, but also has the convenience of having a center guide pin 98 with a key, so that it may be readily and expeditiously oriented when being inserted in its mating socket.

A miniature tube socket 100 is received at the top of base 94, and this in turn receives a miniature tube 60. The latter is protectively housed within a cylindrical casing 102, the lower end of which is received about the socket 100 and base 94, and may be secured thereto in suitable fashion, as by means of small screws 104. The housing 102 is closed at the top by the circular base 106 of the potentiometer 72. The control knob 108 projects from the top, and is readily accessible for manipulation. These parts are secured together in suitable fashion, as by means of a removable split spring ring 110. The housing 102 is large enough, relative to the size of the miniature tube 60, to provide adequate room for the resistors 52 and 88 as well as the capacitor 90 referred to in connection with Fig. 2. These are not shown in the drawing. Moreover, for structural convenience the resistor 92 is also localized at the plug-in unit, and may be located either below or above the miniature tube socket 100.

I consider the use of the octal-type base so desirable that I employ the same even though I really want nine connections into the tube tester, instead of only eight. For this purpose the plug-in unit is additionally provided with a projection or cap, like the grid cap found at the top of many radio tubes. In the present case this cap projects from the side of the insulation base 94, and its inner end is shown at 112 in Fig. 5.

Reverting now to Fig. 1, the tube tester 12 is regularly provided with a flexible lead 114 terminating in a spring clip such as that used for connection to a grid cap at the top of some vacuum tubes. In the present case when the unit 18 is plugged into the tube tester the flexible lead 114 is connected to the cap 112 (Fig. 5), thus providing nine connections into the tube tester.

Referring now to Fig. 6, this is a wiring diagram in which the parts are laid out more nearly in the relationship which they assume in the accessory shown in Fig. 1. Specifically, the flexible cable is a six-wire cable indicated at 20, and the CR tube socket 16 is connected at one end of the cable. The terminals 1, 2, 10, 11 and 12 are employed. When plugged over the neck end of the CR tube the terminal 2 connects to the control electrode G1; the terminal 10 to the grid G2; the terminal 11 to the cathode, while the terminals 1 and 12 provide cathode heater current. The extra flexible lead 22 terminating in a suitable spring clip 24 connects to the cap 26, and thereby to the high voltage grid G3. One of the unused terminals in the socket 16, in this case the terminal 9, is employed merely for mechanical anchorage of the flexible lead 22, so that the lead will extend from the socket 16 instead of directly from the flexible cable 20. It is connected to one of the six wires in cable 20, in this case the wire 120.

At the other end of the flexible cable the conductors are connected to five of the eight prongs of the octal socket, as shown in the diagram, while the sixth wire 120 is connected to the cap 112. This leaves three prongs 6, 7 and 8 for power supply purposes to the amplifier tube 60. The load resistor 52, the potentiometer 72, and the resistor 88 and condenser 90 and the resistor 92 all correspond to the similarly numbered parts in Fig. 2.

The wiring within the tube tester is shown in Fig. 7 of the drawing. It will be understood that this is merely by way of example and shows one particular tube tester, which happens to be of the emission type. However, the tube tester may be a standard tube tester of other type, because all tube testers may be set up to test a rectifier tube or diode, and in that case the test is a simple emission test. Such tube testers are set up for an emission test when the present adapter is used with the tube tester.

Referring to Fig. 7, the row of sockets for receiving different kinds of vacuum tubes is shown along the top of the diagram. The particular socket here employed is the octal socket indicated at 122. This is used in conjunction with the flexible lead 114 with its spring clip 124. The meter is shown at 44, and the power supply transformer at 62. The bank of lever switches is shown at 34, and each switch is movable to any of four positions. It will be understood that the conductors numbered 1 through 10 at the top of the bank of levels extend to corresponding contacts in the sockets, and more specifically, that conductors 1 through 8 lead to the contacts 1 through 8 to socket 122, while the clip 124 and flexible conductor 114 lead to conductor 10. A neon lamp 126 is employed for the short check.

As a rule filament continuity test and short check should be made before testing beam current. For this purpose levers 6 and 7 are placed in the "E" position, which disconnects the filament of the adapter tube 60. The other levers are left in "Common" position. If now any lever is moved from "Common" to "F" the neon tube 126 will light if there is a short circuit between that element and any other element. At this time the meter 44 is in no way involved because it is disconnected unless one presses the three-pole press-to-read button indicated at 128. The heater filament of the CR tube is connected to contacts 1 and 3 of the octal socket, and if levers 1 and 3 are moved from "Common" to "F" the neon tube will light, thus indicating that the filament is intact, or, in other words, checks for continuity, for if the filament were "open" the neon tube would not light. After this test has been made, and also after each lever has been individually moved from "Common" to "F" to make sure that there are no "shorts," the CR tube is ready for the beam current test.

For this the lever system must first be set up to supply filament heating current to the adapter tube 60 without supplying plate potential to the CR tube. Lever 1 is left in "Common"; lever 2 at "E"; lever 3 at "D"; lever 4 at "E"; lever 5 at "E"; lever 6 at "D"; lever 7 at "Common"; lever 8 at "F"; lever 9 at "Common"; and lever 10 at "F." The potentiometer of the adapter is turned all the way to the right, that is, to zero bias, as previously explained, and then the press-to-read button 128 is depressed and the sensitivity control 82 is adjusted to bring the meter reading to the recommended point, say 80% of the scale. While still holding the press-to-read button down the potentiometer is then adjusted to the left to introduce enough negative bias to bring the meter reading down just to zero. The switch lever 5 is then moved from "E" position to "F" position, to apply potential to G2, whereupon the beam current indication is obtained on the meter while still holding or again pressing the press-to-read button 123. The reading should be "good" or at least "weak," the operator simply relying on the word scale of the meter. This incidentally has the practical commercial advantage that the test may be performed in front of the customer.

In the specific apparatus here illustrated the amplifier tube 60 is a 6AB4 tube which is selected to produce the desired amplification while at the same time using a filament potential of 6.3 volts, which corresponds to the filament voltage in CR tubes. The potentiometer has a value of 100 ohms, but this value is not at all critical because the settings are simply relative. The resistor 92 for coupling the control electrode of the CR tube to the cathode has a value of 470,000 ohms, but this is not critical, for all that is required is that it be high enough not to act like a short circuit during the short check, and yet provide a return path to the cathode for the escape of electrons.

The load resistor 52 has a value of 150,000 ohms, while the resistor 88 has a value of 470,000 ohms and the condenser a value of 0.05 mfd. These values are for a tube tester having a meter with a five milliampere range, and having a word scale in which the weak zone (or division between bad and good tubes if there be no weak zone) is at the center of the scale when working with a plate voltage of approximately R. M. S. 229 volts. More specifically, the transformer secondary 64 has an overall R. M. S. voltage of 235 volts, of which, however, 6.3 volts are subtracted at the negative end 73 to produce bias voltage and heater current.

It will be understood that these values are given solely by way of example, and not in limitation of the invention. Other tube testers may happen to employ a meter of different scale range, or may happen to place the weak zone offset somewhat from the center of the scale, and appropriate changes may be made in the values of the circuit elements to take care of such different situations.

It is believed that the construction and method of use of my improved adapter for the testing of CR tubes, as well as the advantages thereof, will be apparent from the foregoing detailed description. The adapter is small, light and compact. It is easy and convenient to handle, there being only a small plug-in unit which is plugged in to an octal socket of a conventional tube tester. Unlike prior adapter, mine tests the CR tube for beam current instead of total emission. For this purpose the beam current is amplified so as to be usable in a milliammeter, and what is more important, the characteristic of the amplifier tube is so modified as to make the response fit the conventional word scale commonly used on tube testers. The adapter provides for zero and calibrating adjustments which compensate for aging or other changes in the components. The adapter includes sufficient connections to make possible a filament continuity test, and a short check of all of the elements, in addition to the beam current test.

It will be understood that while I have shown and described the invention in a preferred form, changes may be made in the structure and circuit shown without departing from the scope of the present invention, as sought to be defined in the following claims.

I claim:

1. Apparatus for testing the beam current of a CR tube by means of a conventional emission type vacuum tube tester having a meter with a word scale with about half the scale used for "replace" or equivalent and about half of the scale used for "good" or equivalent, said apparatus comprising an accessory amplifier tube outside the tube tester between the beam current circuit of the CR tube and the meter, and circuit elements associated with the amplifier tube to so flatten the tube characteristic that the "replace" and "good" markings of the scale will be applicable to the beam current of CR tubes.

2. Apparatus for testing the beam current of a CR tube by means of a conventional emission type vacuum tube tester having a meter with a word scale with a large part of the scale used for "replace" or equivalent and a large part of the scale used for "good" or equivalent, said apparatus comprising an accessory amplifier tube outside the tube tester having a resistor between its grid and cathode, means to pass the beam current of the CR tube through said resistor in proper direction as to apply a positive potential to the grid of the tube, means to connect the aforesaid meter in the plate circuit of the amplifier tube, and an RC circuit connected between the grid and cathode of the amplifier tube with values selected to so flatten the tube characteristic that the beam currents required for deflection are in non-linear relation such that the "replace" and "good" markings of the scale will be applicable to the beam current of CR tubes.

3. Apparatus for testing the beam current of a CR tube by means of a conventional emission type vacuum tube tester having a meter with a word scale with about half the scale used for "replace" or equivalent and about half of the scale used for "good" or equivalent, said apparatus comprising an accessory amplifier tube outside the tube tester having a resistor between its grid and cathode, means to pass the beam current of the CR tube through said resistor in proper direction as to apply a positive potential to the grid of the tube, means to connect the aforesaid meter in the plate circuit of the amplifier tube, and an RC circuit connected between the grid and cathode of the amplifier tube with values selected to so flatten the tube characteristic that a small fraction of normal beam current will produce about one-half meter deflection, and a new-tube normal beam current will produce a meter deflection of from 75% to 100% of the meter scale.

4. An adapter for adapting an ordinary vacuum tube tester having a milliammeter to the testing of microamperes of beam current of CR tubes, said adapter comprising a standard CR tube socket, a plug-in unit, a multi-wire flexible cable between said socket and said unit, said unit comprising a housing, a vacuum tube base at the bottom of said housing to act as a male connector, a tube socket carried by said housing, a tube received by said socket, a potentiometer carried by said housing, and appropriate additional impedances carried by said housing, the arrangement being such that said unit may be bodily plugged into a selected one of the available sockets of the vacuum tube tester.

5. An adapter as defined in claim 4, in which there is an additional flexible lead terminating in a clip suitable for connection to the high voltage cap of the CR tube being tested.

6. An adapter for adapting an ordinary vacuum tube tester having a milliammeter to the testing of microamperes of beam current of CR tubes, said adapter comprising a standard CR tube socket, a plug-in unit, a multi-wire flexible cable between said socket and said unit, said unit comprising a housing, an octal-type vacuum tube base at the bottom of said housing to act as a male connector, a miniature tube socket within said housing, a miniature tube received by said socket, a potentiometer having its knob accessible outside said housing, and appropriate additional impedances in said housing, the arrangement being such that said unit may be bodily plugged into a mating octal socket of the vacuum tube tester.

7. An adapter as defined in claim 6, in which there is an additional flexible lead terminating in a clip suitable for connection to the high voltage cap of the CR tube being tested.

8. An adapter as defined in claim 6, in which a ninth connection into the tube tester is obtained by the provision of a grid cap type of terminal projecting from the plug-in unit, so that nine connections may be provided while retaining the sturdy rigidity and convenience of an octal base.

9. An adapter for adapting an ordinary vacuum tube tester having a milliammeter to the testing of microamperes of beam current of CR tubes, said adapter comprising a standard CR tube socket, a plug-in unit, a multiwire flexible cable having one end wired to said socket, and its other end wired to said plug-in unit, said plug-in unit comprising a cylindrical housing, an octal-type vacuum tube base at the bottom of said housing to act as a male connector, a miniature tube socket within said housing, a miniature tube received by said miniature socket, a potentiometer mounted at the top of said housing with its knob accessible above said housing, and appropriate additional impedances in said housing, the arrangement being such that said unit may be bodily plugged into a mating octal socket of the vacuum tube tester.

10. An adapter as defined in claim 9, in which there is an additional flexible lead secured to the CR tube socket and terminating in a clip suitable for connection to the high voltage cap of the CR tube being tested.

11. An adapter as defined in claim 9, in which a ninth connection into the tube tester is obtained by the provision of a grid cap type of terminal projecting from the insulation side wall of the octal type vacuum tube base, so that nine connections may be provided while retaining the sturdy rigidity and convenience of an octal base.

12. The method of using a conventional emission type vacuum tube tester having a conventional word scale, with a large part of the scale used for "replace" or equivalent and a large part of the scale used for "good" or equivalent, for the testing of the beam current of CR tubes, which includes amplifying the beam current by means of an accessory amplifier tube, and so modifying and flattening the tube characteristic of the said amplifier tube as to cause a large part of the meter deflection to correspond to inadequate beam current, and a large part to correspond to adequate beam current, said large parts being commensurate with the conventional word scale already present on the vacuum tube tester, in order to thereby fit the resulting test to the said conventional word scale.

13. Apparatus for testing the beam current of a CR tube by means of a conventional emission type vacuum tube tester having a meter with a word scale, with a large part of the scale used for "replace" or equivalent and a large part of the scale used for "good" or equivalent, a power supply, a series of test sockets, and a series of selector switches for providing connections to said test sockets, said apparatus comprising an accessory amplifier tube outside of but for use with the tube tester and having an input resistor between its grid and cathode, means to facilitate connection to a CR tube to apply its beam current through said input resistor, means associated with the grid circuit of said accessory tube for the bias thereof, and means having prongs like a vacuum tube and affording the necessary connections for energizing the cathode heater and for deriving the bias and anode potentials for the said accessory amplifier tube from the regular power supply of the vacuum tube tester by plugging into one of the regular test sockets of the tube tester.

14. Apparatus for testing the beam current of a CR tube by means of a conventional emission type vacuum tube tester having a meter with a word scale, with a large part of the scale used for "replace" or equivalent and a large part of the scale used for "good" or equivalent, and having a variable resistor shunting said meter, a power supply, a series of test sockets, and a series of selector switches for providing connections to said test sockets, said apparatus comprising an accessory amplifier tube outside of but for use with the tube tester and having an input resistor between its grid and cathode, means to facilitate connection to a CR tube to apply its beam current through said input resistor, means associated with the grid circuit of said accessory tube for varying the bias thereof, and means having prongs like a vacuum tube and affording the necessary connections for energizing the cathode heater and for deriving the bias and anode potentials for the said accessory amplifier tube from the regular power supply of the vacuum tube tester by plugging into one of the regular test sockets of the tube tester, the variable resistor shunting the meter of the tube tester being so adjusted that the meter reads approximately in the mid-region of the "good" part of the word scale when the bias of the accessory tube is zero with no CR tube connected in circuit, the bias of the accessory tube being adjusted to place the reading of the meter at zero with the shunt resistor adjusted as aforesaid and with no CR tube in circuit, and said selector switches being properly set for the test socket to which the accessory tube is connected by said means having prongs like a vacuum tube.

15. Apparatus for testing the beam current of a CR tube by means of a conventional emission type vacuum tube tester having a meter with a word scale, with a large part of the scale used for "replace" or equivalent and a large part of the scale used for "good" or equivalent, a power supply, a series of test sockets, and a series of selector switches for providing connections to said test sockets, said apparatus comprising an accessory amplifier tube outside of but for use with the tube tester and having an input resistor between its grid and cathode, means to facilitate connection to a CR tube to apply its beam current through said input resistor, means associated with the grid circuit of said accessory tube for the bias thereof, an RC circuit connected between the grid and cathode of said accessory amplifier tube with values selected to so flatten the tube characteristic that the beam currents required for deflection are in non-linear relation such that the "replace" and "good" markings of the scale will be applicable to the beam current of CR tubes, and means having prongs like a vacuum tube and affording the necessary connections for energizing the cathode heater and for deriving the bias and anode potentials for the said accessory amplifier tube from the regular power supply of the vacuum tube tester by plugging into one of the regular test sockets of the tube tester.

16. Apparatus for testing the beam current of a CR tube by means of a conventional emission type vacuum tube tester having a meter with a word scale, with a large part of the scale used for "replace" or equivalent and a large part of the scale used for "good" or equivalent, and having a variable resistor shunting said meter, a power supply, a series of test sockets, and a series of selector switches for providing connections to said test sockets, said apparatus comprising an accessory amplifier tube outside of but for use with the tube tester and having an input resistor between its grid and cathode, means to facilitate connection to a CR tube to apply its beam current through said input resistor, means associated with the grid circuit of said accessory tube for varying the bias thereof, an RC circuit connected between the grid and cathode of said accessory amplifier tube with values selected to so flatten the tube characteristic that the beam currents required for deflection are in non-linear relation such that the "replace" and "good" markings of the scale will be applicable to the beam current of CR tubes, and means having prongs like a vacuum tube and affording the necessary connections for energizing the cathode heater and for deriving the bias and anode potentials for the said accessory amplifier tube from the regular power supply of the vacuum tube tester by plugging into one of the regular test sockets of the tube tester, the variable resistor shunting the meter of the tube tester being so adjusted that the meter reads approximately in the mid-region of the "good" part of the word scale when the bias of the accessory tube is zero with no CR tube connected in circuit, the bias of the accessory tube being adjusted to place the reading of the meter at zero with the shunt resistor adjusted as aforesaid and with no CR tube in circuit, and said selector switches being properly set for the test socket to which the accessory tube is connected by said means having prongs like a vacuum tube.

17. The method of using a conventional emission type vacuum tube tester having a meter with a conventional word scale and a variable resistor shunting said meter, for the testing of the beam current of CR tubes, which includes connecting an accessory amplifier tube ahead of the meter of the tube tester, with means associated with the grid circuit of said tube for varying the bias thereof, preliminarily reducing the bias of the accessory tube to zero, then adjusting the variable resistor shunting the meter of the tube tester to bring the indicator to approximately the mid-region of the "good" portion of the scale, then increasing the negative bias of the accessory tube to reduce the meter reading substantially to zero, and thereafter applying to the input circuit of said accessory tube a positive potential derived from and proportional to the beam current of the CR tube to be tested.

18. The method of using a conventional emission type vacuum tube tester having a meter with a conventional word scale and a variable resistor shunting said meter, for the testing of the beam current of CR tubes, which includes connecting an accessory amplifier tube ahead of the meter of the tube tester, with means associated with the grid circuit of said tube for varying the bias thereof, preliminarily reducing the bias of the accessory tube to zero, then adjusting the variable resistor shunting the meter of the tube tester to bring the indicator to approximately the mid-region of the "good" portion of the scale, then increasing the negative bias of the accessory tube to reduce the meter reading substantially to zero, and thereafter applying to the input circuit of said accessory tube a positive potential derived from and proportional to the beam current of the CR tube to be tested, and so modifying and flattening the tube characteristic of said accessory amplifier tube as to cause a large part of the meter deflection to correspond to inadequate beam current, and a large part to correspond to adequate beam current, with said large parts being commensurate with the conventional word scale already present on the meter of the vacuum tube tester in order to thereby fit the said word scale.

19. The method of using a conventional emission type vacuum tube tester having a meter with a conventional word scale and a variable resistor shunting said meter, for the testing of the beam current of CR tubes, which includes connecting an accessory amplifier tube ahead of the meter of the tube tester, with means associated with the grid circuit of said tube for varying the bias thereof, energizing the cathode heater and deriving the bias and the anode potentials for said accessory amplifier tube from the regular power supply of the vacuum tube tester by making the necessary connections through one of the regular test sockets of the tube tester and properly setting the selector switches of the tube tester for the said test socket, preliminarily reducing the bias of the accessory tube to zero, then adjusting the variable resistor shunting the meter of the tube tester to bring the indicaor to approximately the mid-region of the "good" portion of the scale, then increasing the negative bias of the accessory tube to reduce the meter reading substantially to zero, and thereafter applying to the input circuit of said accessory tube a positive potential derived from and proportional to the beam current of the CR tube to be tested.

20. The method of using a conventional emission type vacuum tube tester having a meter with a conventional word scale and a variable resistor shunting said meter, for the testing of the beam current of CR tubes, which includes connecting an accessory amplifier tube ahead of the meter of the tube tester, with means associated with the grid circuit of said tube for varying the bias thereof, energizing the cathode heater and deriving the bias and the anode potentials for said accessory amplifier tube from the regular power supply of the vacuum tube tester by making the necessary connections through one of the regular test sockets of the tube tester and properly setting the selector switches of the tube tester for the said test socket preliminarily reducing the bias of the accessory tube to zero, then adjusting the variable resistor shunting the meter of the tube tester to bring the indicator to approximately the mid-region of the "good" portion of the scale, then increasing the negative bias of the accessory tube to reduce the meter reading substantially to zero, and thereafter applying to the input circuit of said accessory tube a positive potential derived from and proportional to the beam current of the CR tube to be tested, and so modifying and flattening the tube characteristic of said accessory amplifier tube as to cause a large part of the meter deflection to correspond to inadequate beam current, and a large part to correspond to adequate beam current, with said large parts being commensurate with the conventional word scale already present on the meter of the vacuum tube tester in order to thereby fit the said word scale.

References Cited in the file of this patent

UNITED STATES PATENTS

| | | |
|---|---|---|
| 2,053,101 | Olesen | Sept. 1, 1936 |
| 2,389,991 | Mayle | Nov. 27, 1945 |
| 2,434,823 | Van Beuren et al. | Jan. 20, 1948 |
| 2,478,742 | Buonincontri | Aug. 9, 1949 |